United States Patent
Krishnan et al.

(10) Patent No.: US 10,846,718 B2
(45) Date of Patent: Nov. 24, 2020

(54) ELECTRONIC SURVEY AND ENTITY MATCHING MARKETPLACE

(71) Applicant: Lucid Holdings, LLC, New Orleans, LA (US)

(72) Inventors: Vignesh Krishnan, New Orleans, LA (US); William Bradley, New Orleans, LA (US)

(73) Assignee: Lucid Holdings, LLC, New Orleans, LA (US)

( * ) Notice: Subject to any disclaimer, the term of this patent is extended or adjusted under 35 U.S.C. 154(b) by 276 days.

(21) Appl. No.: 15/787,017

(22) Filed: Oct. 18, 2017

(65) Prior Publication Data
US 2019/0114653 A1    Apr. 18, 2019

(51) Int. Cl.
   *G06Q 30/02*    (2012.01)
   *H04L 29/08*    (2006.01)

(52) U.S. Cl.
   CPC ..... *G06Q 30/0203* (2013.01); *G06Q 30/0217* (2013.01); *G06Q 30/0225* (2013.01); *G06Q 30/0245* (2013.01); *G06Q 30/0273* (2013.01); *H04L 67/306* (2013.01)

(58) Field of Classification Search
   CPC .......... G06Q 30/0203; G06Q 30/0217; G06Q 30/0225; G06Q 30/0245; G06Q 30/0273; H04L 67/306
   See application file for complete search history.

(56) References Cited

U.S. PATENT DOCUMENTS

| | | | | |
|---|---|---|---|---|
| 2002/0016727 | A1* | 2/2002 | Harrell | G06Q 30/0201 705/7.29 |
| 2003/0097657 | A1* | 5/2003 | Zhou | H04N 7/163 725/46 |
| 2003/0204437 | A1* | 10/2003 | Flender | G06Q 30/02 705/7.32 |
| 2004/0230676 | A1* | 11/2004 | Spivack | G06Q 10/087 709/223 |
| 2005/0075919 | A1* | 4/2005 | Kim | G06Q 10/06316 705/7.26 |

(Continued)

FOREIGN PATENT DOCUMENTS

| | | |
|---|---|---|
| WO | WO-0142873 A2 | 6/2001 |
| WO | WO-2018165553 A1 | 9/2018 |

OTHER PUBLICATIONS

"European Application Serial No. 18201336.7, Extended European Search Report dated Dec. 17, 2018", 9 pgs.

*Primary Examiner* — Sujay Koneru
(74) *Attorney, Agent, or Firm* — Schwegman Lundberg & Woessner, P.A.

(57) ABSTRACT

Disclosed in some examples is a question platform which matches survey creators with survey takers (entities) referred by publishers. In some examples, the match can happen in real-time or near real time based upon a number of match criteria. Match criteria may include survey creator criteria submitted by the survey creators that describe desired entity attributes, a bid price (e.g., maximum price they are willing to pay), and survey content information. Match criteria may also include publisher criteria that describe entity information, an ask price (minimum price that the publisher is willing to accept for providing access to the entity), and content criteria (e.g., restrictions on the types of survey, the number of questions, and the like).

17 Claims, 5 Drawing Sheets

(56) References Cited

U.S. PATENT DOCUMENTS

| | | | | |
|---|---|---|---|---|
| 2006/0143228 A1* | 6/2006 | Odio-Paez | ............ | G06Q 10/107 |
| 2008/0109278 A1* | 5/2008 | Rao | ................. | G06Q 30/02 |
| | | | | 705/7.32 |
| 2009/0222324 A1* | 9/2009 | Johnson | ................. | G06Q 30/02 |
| | | | | 705/35 |
| 2009/0271272 A1* | 10/2009 | Berkowitz | ............ | G06Q 30/02 |
| | | | | 705/14.67 |
| 2010/0324971 A1* | 12/2010 | Morsberger | ............ | G06Q 30/02 |
| | | | | 705/7.32 |
| 2012/0173305 A1* | 7/2012 | Bhaskaran | ............ | G06Q 30/02 |
| | | | | 705/7.32 |
| 2013/0004933 A1* | 1/2013 | Bhaskaran | ............... | G09B 7/00 |
| | | | | 434/362 |
| 2013/0132328 A1* | 5/2013 | Alush | ................. | G06Q 30/0203 |
| | | | | 706/52 |
| 2013/0226664 A1* | 8/2013 | Rinzler | ............. | G06Q 30/0203 |
| | | | | 705/7.32 |
| 2014/0095259 A1* | 4/2014 | Weiss | ................. | G06Q 30/0211 |
| | | | | 705/7.32 |
| 2014/0149203 A1* | 5/2014 | Narancsik | ........... | G06Q 30/0269 |
| | | | | 705/14.39 |
| 2014/0257931 A1* | 9/2014 | Rinzler | ............. | G06Q 30/0203 |
| | | | | 705/7.32 |
| 2015/0235307 A1* | 8/2015 | Webb | .................... | G06Q 30/08 |
| | | | | 705/7.32 |
| 2015/0324821 A1* | 11/2015 | Rincon | ............. | G06Q 30/0203 |
| | | | | 705/7.33 |
| 2016/0232155 A1* | 8/2016 | Allen | .................... | G06F 17/277 |
| 2017/0255964 A1* | 9/2017 | Hendricks | ............. | G06Q 20/40 |
| 2017/0286934 A1* | 10/2017 | Poreh | ................. | G06Q 20/1235 |
| 2018/0040161 A1* | 2/2018 | Tierney | ................. | G06T 19/006 |
| 2019/0114653 A1* | 4/2019 | Krishnan | ........... | G06Q 30/0245 |

* cited by examiner

ELECTRONIC SURVEY AND ENTITY MATCHING MARKETPLACE

TECHNICAL FIELD

Embodiments pertain to improved computing devices that implement an electronic survey and entity matching marketplace for network-based surveys. Some embodiments relate to the use of advanced algorithms to match surveys and participants.

BACKGROUND

Many companies perform market research to determine consumer reaction to products, advertising, costs, or other aspects of consumer-facing business. One method of traditional market research that has recently increased in popularity is surveys. Surveys are used to ask respondents questions about experiences or future decisions. Information gathered from surveys helps companies design, market, innovate, and finance products or services.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
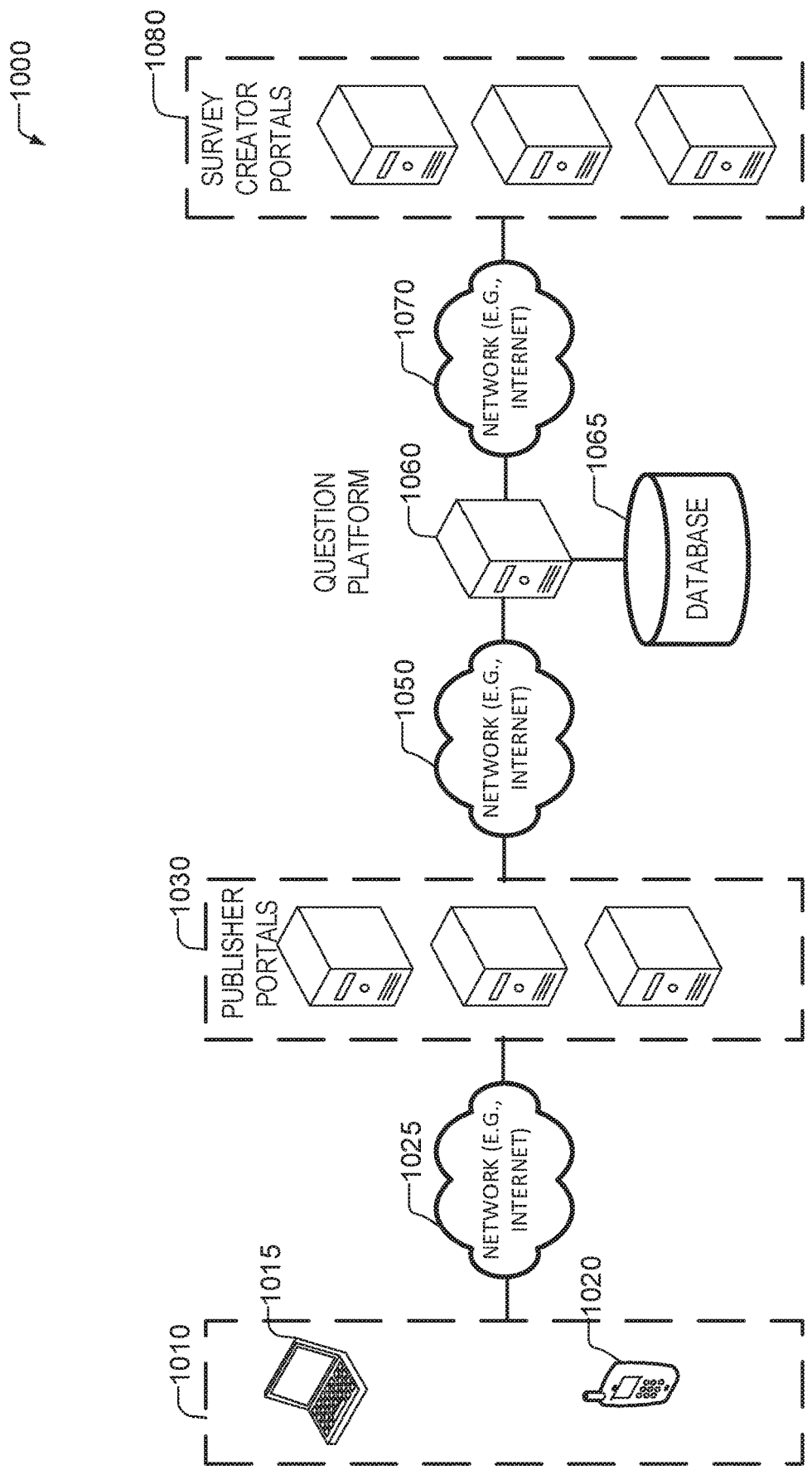
FIG. 1 shows a diagram of a question platform system environment according to some examples of the present disclosure.

Companies perform surveys in order to solicit feedback from customers or potential customers, determine buying habits, determine effectiveness of advertisements, or for a variety of other reasons. When a company decides to conduct an electronic survey, the company must determine survey questions to ask and find respondents to answer the electronic survey questions. Companies typically want respondents to be within one more demographic categories, such as those related to age, gender, income, marriage status, number of children, recently viewed advertisements, location, purchased products, intent to purchase products, stores frequented, or the like. Companies wishing to perform surveys run into problems finding enough qualified survey participants for their electronic surveys.

On the other hand, publishers of content, websites, and other online services have access to wide varieties of individuals who may be interested in an electronic survey. For example, social networking services have millions of visitors a day and have access to demographic information. As another example, news organizations also have millions of visitors a day, many of them repeat visitors. These publishers have an opportunity to increase their revenue streams by providing access to these visitors (called entities) for the purposes of taking surveys. These entities may be compensated for agreeing to take the survey. In turn, publishers may also earn a profit by referring the entity to a survey creator. Despite these opportunities, there currently does not exist a technological solution for linking publishers who have access to survey participants and survey creators. Content publishers and survey companies may enter into individual agreements, but this is inefficient as the volume of traffic to publishers and the demographics of that traffic is difficult to guarantee.

Disclosed in some examples is a question platform which matches survey creators with survey takers (entities) referred by publishers. In some examples, the match can happen in real-time or near real-time based upon a number of match criteria. Match criteria may include survey creator criteria submitted by the survey creators that describe desired entity attributes, a bid price (e.g., maximum price the survey creator is willing to pay), and survey content information. Match criteria may also include publisher criteria that describe entity information, an ask price (e.g., minimum price that the publisher is willing to accept for providing access to the entity, minimum price that the entity is willing to accept, and the like), and content criteria (e.g., restrictions on the types of survey, the number of questions, and the like).

A survey may be comprised of one or more questions for an entity to answer. The survey may include questions concerning demographics and entity opinions about products, services, and publisher content. The forms of answers an entity may provide to the survey questions may include free form text, a singular selection from multiple options, and multiple selections from multiple options.

The disclosed question platform receives entity availability notifications from publishers via publisher portals. These entity availability notifications may include the publisher criteria. The question platform also receives survey requests from survey creator portals (e.g., companies or marketing agencies that wish to provide surveys). The survey requests may include the survey creator criteria, and a list of questions. In some examples, the survey requests may include a number of entities (e.g., a minimum number before the survey creator will pay or a maximum number that the survey creator is willing to pay) that are requested to take the survey. Each entity may have the same or different survey creator criteria. The system may then match entities with surveys based upon the survey creator criteria and publisher criteria. The system may then create a digital contract, forward the survey questions to the publisher through a publisher portal, receive the results, and then forward the results to the survey creator through the survey creator portals. In some examples, the system may also handle payment to ensure the publisher gets paid, but also ensure the survey creator gets their results.

As noted, in some examples, the survey requests may contain the questions. In other examples, the survey requests may include one or more GUI descriptors. For example, one or more hypertext markup language (HTML) documents, Javascript documents, scripting language documents, eXtensible markup language (XML) documents, Cascading Style Sheets (CSS), and the like. These documents specify a manner of presentation of the survey questions. This may be embedded inside an iFrame or other GUI element of the publisher's portal (e.g., the publisher's website). In still other examples, the survey requests may provide a redirect link that allows the publisher to redirect the entity's browser to download the content directly from the survey creator. This may be displayed as part of the publisher's publisher portal.

Turning now to FIG. 1, a diagram of a question platform system environment 1000 is shown according to some examples of the present disclosure. End user computing devices 1010 such as a laptop 1015 and a smartphone 1020 may connect through a network 1025 to one or more publisher portals 1030. Publisher portals 1030 may provide websites or web services. Examples include social networking services, news sites, entertainment sites, blogs, search engines, content services, and the like. These publisher portals may serve content, such as websites, webpages, information, news, videos, audio, and the like to one or more end user computing devices 1010. Publisher portals 1030 may also determine which of the end users utilizing one or more of the end user computing devices 1010 are receptive and willing to take a survey. For example, the publishers may ask one of the end users if they wish to take a survey. Publisher portals 1030 submit entity availability notifications for identified entities that are willing to participate in surveys through network 1050 to question platform 1060. The entity availability notifications may specify an identifier for each user and publisher criteria. Entity availability notifications may specify one or more entities (e.g., the entity availability notification may be a batch of offered entities), and the match criteria may apply to all the offered entities, or match criteria may be specific for each entity. That is, some entities may have different match criteria than other entities.

Meanwhile, companies who wish to purchase access to survey participants to take surveys utilize survey creator portals 1080. Survey creator portals 1080 are computing devices which communicate over network 1070 with question platform 1060 (e.g., using an API), and in some examples, publisher portals 1030 and end user computing devices 1010. Survey creator portals 1080 may submit to the question platform 1060 over network 1070 survey requests which specify survey creator criteria, a number of participants, and the like.

Networks 1025, 1050, and 1070 may be the same network, portions of the same network that may or may not have overlapping portions, or different networks. Example networks include the Internet, a Wide Area Network (WAN), a Local Area Network (LAN), a Metropolitan Area Network (MAN), and the like. Publisher portals 1030 may communicate with the question platform 1060 utilizing a publisher portal Application Programming Interface (API). Likewise, the survey creator portals 1080 may communicate with the question platform 1060 using a purchaser API.

Question platform 1060 receives the survey requests and the entity availability notifications and attempts to match entities offered by the entity availability notifications with surveys requested by the survey creator portals 1080. Question platform 1060 may store entity availability notifications, survey requests, and information about entities in one or more databases, such as database 1065. To match entities to survey requests, the question platform 1060 may utilize the match criteria. For example, the question platform 1060 may utilize bid and ask prices; demographic information; and survey information and conditions. For example, the question platform 1060 may first determine a set of entities offered by one or more publisher portals 1030 that meet the required demographics of the survey. Survey participants selected for a same survey may come from one or more different publisher portals from one or more different entity availability notifications—likewise multiple entities from a single entity availability notification may be fulfilled with one or more different surveys. Indeed, some entity availability notifications may specify that the entity is available for multiple surveys. From there, the conditions and survey information are utilized to filter out any entities that are restricted for a particular survey. For example, the survey may include adult content and the entity availability notification may indicate that adult content is not allowed.

The set of eligible entities are then selected on the basis of the bid and ask price. As previously noted, the bid price is the maximum price the survey creator will pay and the ask price is the minimum price that the publisher or entity will accept. If the bid price for an entity is greater than or equal to the ask price, then the entity may be selected. In some examples, the spread (the difference between the bid and ask prices) is collected as a processing fee by the question platform. In some examples, in order to maximize the spread, the question platform may assign eligible entities to surveys in a way that maximizes the spread. For example, if a particular entity is eligible to take two different surveys, the survey that offers the highest bid price will be selected so as to maximize the spread.

In order to determine whether the entity is a qualified entity for a particular survey, the publisher portal may provide demographics information for the entity. The demographic information provided by the publisher portal may not be complete. Despite this, the entity may have participated in a survey previously on behalf of a second publisher portal. The information provided by all the different publisher portals for the same entity may be combined to provide a complete picture of the demographics of the entity. As noted the information a publisher knows about a particular entity may not be complete. Thus, a technical challenge exists to identify entities across publisher portals and across devices.

In some examples, the question platform may track entities based upon a device identifier, or other identification, such as a name, physical address, IP Address, and the like. This information may be provided by the publisher portals and may be stored in database 1065 in an entity profile (which may comprise all information that the question platform knows about the entity) and may be utilized to track a user across one or more publisher portals 1030. As an entity availability notification comes in, the entities and the information about those entities is compared with a database of entity profiles to determine if a profile for the user is already present. If a profile is already present, any new information provided by the entity by the publisher in the entity availability notification is stored in the profile. In some examples, the profile includes fields for demographic information (e.g., gender, age, ethnicity, geolocation, occupation, salary, and the like) for the entity.

In some examples, question platform 1060 may provide to an entity a cookie or other tracking token (e.g., a beacon image) in a survey, on a website, or as a result of visiting the publisher portal (e.g., the publisher portal may put the tracking cookie on the entity's computing device at the request of the question platform). This cookie may track browsing history or other information about the entity via monitoring the entity's use of the end user computing devices 1010.

The completeness of the profile depends on the information available to the publisher and the question platform

1060. In some examples, some information may be known with certainty based upon information collected by the publisher portal, information ascertained as a result of direct questioning (e.g., the question platform 1060 may direct the publisher portal 1030 to ask screener questions to ascertain certain demographic information), information determined from tracking cookies and beacon images, and the like. Information about entities may be determined across multiple publisher portals. That is, one publisher portal may provide some demographic information about an entity and another publisher portal may provide other demographic information about the entity. As noted, the question platform may determine from the information provided by publisher portals that the entities are a same entity and that the demographic information from each publisher should be merged in the entity profile.

In some examples, the system may not be able to determine for sure if an existing profile matches an entity in an entity availability notification. For example, a publisher portal may submit an entity availability notification containing an identifier that is a name and the name may be similar to a name of an entity already stored in a profile in database 1065. In these examples, the question platform 1060 may establish a confidence score that the information in the entity availability notification describes the entity described by the profile in the database 1065 (e.g., in the case of names, by a fuzzy string matching algorithm that counts the number of substitutions necessary to convert one name to another). In other examples, a weighted summation may be utilized to produce a confidence score. For example, each item of information that matches exactly may count towards a predetermined number of points towards a final confidence score and each item of information that partially matches may receive a number of points that depends on how close the match is. If the confidence score is above a predetermined threshold, the question platform determines that the entities are the same.

In some examples, the question platform may not know a particular demographic detail about an entity. As previously noted, the system may direct the publisher portal 1030 to ask a question to determine this information called a screener. In other examples, the question platform may determine a probability that a particular entity meets one of the demographic criteria. For example, the question platform may not know that an entity is female, but may calculate with 55% probability that the entity is female. The probability may be based upon the rest of the entities' profile. For example, the question platform may build a machine learning model for each item of information in an entity profile. That is, a gender model, a geolocation model, an age model, and the like. The models may include support vector machines, logistic regression, neural networks, and the like. The model may base the probabilities on other demographic and preference characteristics known about the entity. For example, each demographic model may be trained based upon training data where the demographic characteristic is known to the question platform and the user profile includes other demographic and preference characteristics (e.g., from tracking cookies and/or past survey responses that indicate a consumer preference). The label applied to the training data is the known demographic characteristic. The model then determines a probability that an entity has a particular demographic characteristic (e.g., is male/female) based upon how similar the other demographic characteristics and consumer preferences are to entities where the demographic characteristic is known. For example, an entity where a gender is not known that has other demographic characteristics and other preferences that are similar to other entities that are male may be more likely to be male.

In some examples, if a demographic characteristic is not known, but is above a predetermined probability, the question platform may assume the risk that the prediction is wrong by assuming the liability of the contract. To confirm or deny the prediction, the question platform may insert a proof question in the survey.

Figure 2:
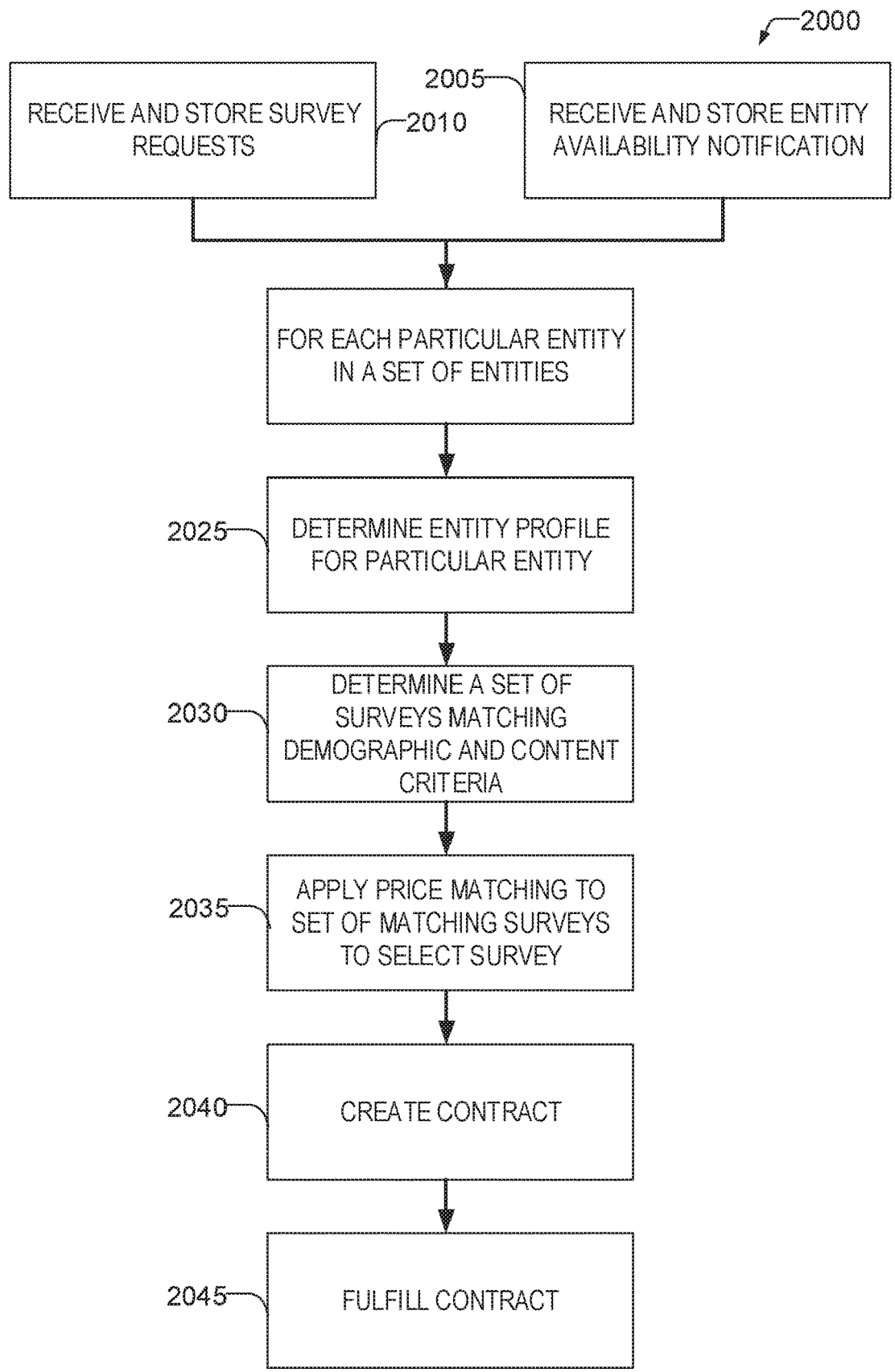
FIG. 2 shows a flowchart of a method for matching survey requests with entities offered by publishers is shown according to some examples of the present disclosure.

Turning now to FIG. 2, a flowchart of a method 2000 for matching survey requests with entities offered by publishers is shown according to some examples of the present disclosure. At operation 2005, the question platform may receive an entity availability notification and store it in a database of entity availability notifications. In some examples, the entity availability notifications are received through a publisher portal API. At operation 2010 the question platform may receive and store survey requests. Operations 2005 and 2010 may be performed in any order and may be performed continuously and in parallel.

Operations 2025-2045 may be performed for each particular entity in a set of one or more entities. For example, a single entity, all entities in an entity availability notification, all entities in all entity availability notifications, or the like. Operations 2025-2045 may be triggered upon receipt of a survey request, a receipt of an entity availability notification, with a predetermined regularity, after a particular number of received entities, after a particular number of received survey requests, continuously, or the like. At operation 2025 the question platform may determine an entity profile for the particular entity. In some examples, the entity profile may comprise only the information provided by the entity availability notification in which the entity was offered. In other examples, the entity profile may comprise both the information provided by the entity availability notification in which the entity was offered as well as previously collected information about the entity.

At operation 2030 the question platform may determine a set of surveys that match demographic and content criteria. For example, the demographic criteria in the survey request may be compared with known demographic information in the entity profile for the particular entity. If the entity matches the desired demographics, or the question platform determines with a probability that the entity matches the desired demographic, then the content of the survey may be compared with content criteria in the entity availability notification to determine if the content of the survey meets the content criteria. For example, the entity availability notification may specify content criteria such as whether adult content is acceptable, how many questions, and the like. If the content criteria are met, then the survey is included in the set of surveys matching demographic and content criteria. If either the content criteria and/or the demographic criteria are not met, the survey may not be added to the set of matching surveys and may not be matched to the entity.

At operation 2035 the set of matching surveys may be evaluated using a pricing model to match one of the set of matching surveys to the entity. As previously noted, the bid price is the maximum price the survey creator will pay and the ask price is the minimum price that the publisher or the entity will accept. In some examples, the set of matching surveys is filtered to remove surveys where the bid price is less than the ask price. The survey that is assigned an entity may be assigned from the remaining set of surveys. For example, the survey that provides the greatest spread or a survey where the bid price exceeds the ask price by the least amount. While a spread is one way for the question platform to make money off the matching, other examples include subscriptions, listing fees, and the like.

Once a survey is assigned an entity, a digital contract is created at operation 2040. This contract may be stored in the database of the question platform, may be provided to publishers through the publisher portals, may be provided to survey creators, and/or the like. At operation 2045 the question portal may facilitate fulfilling the contract.

Figure 3:
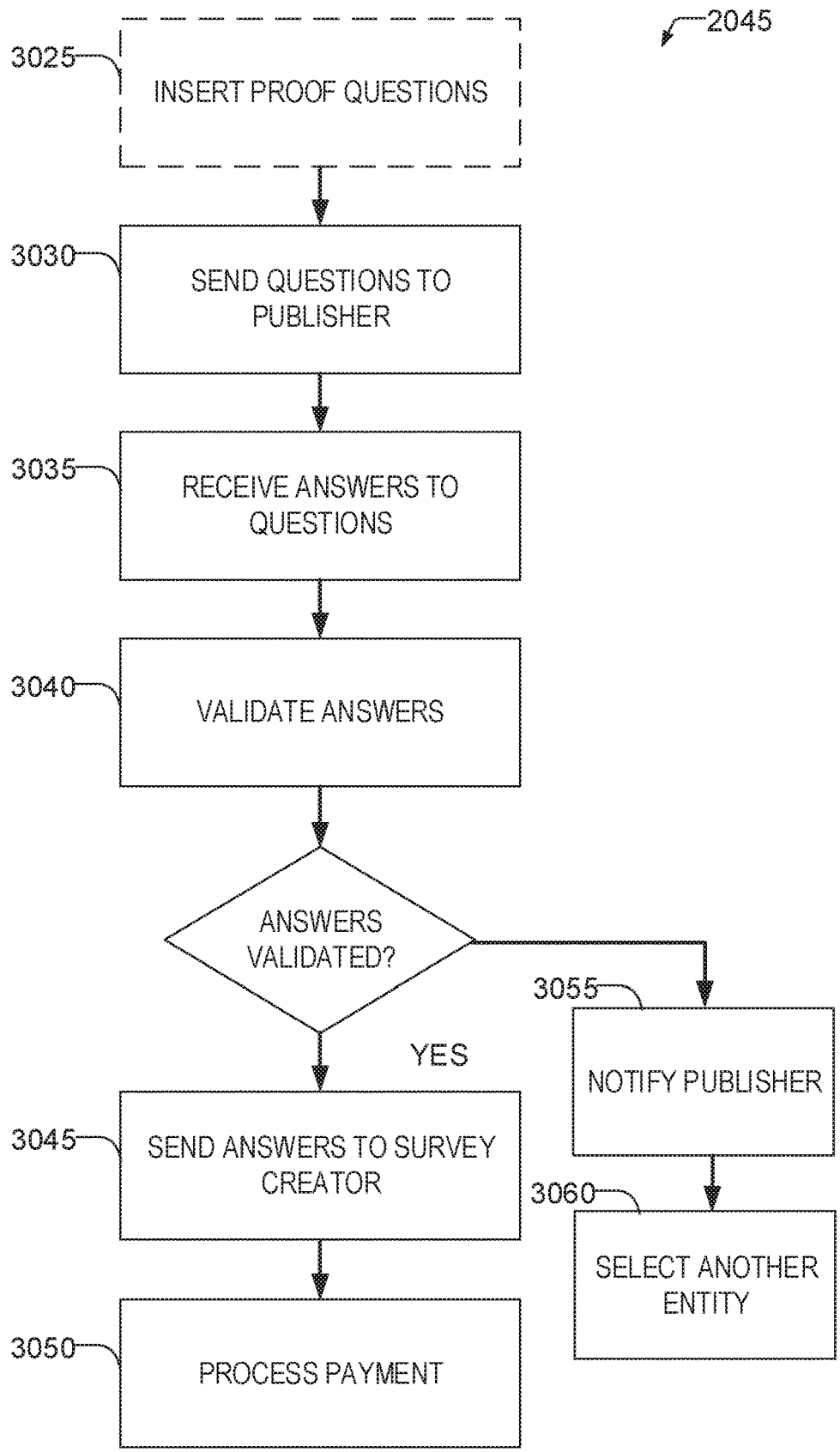
FIG. 3 shows one example of fulfilling the contract performed by a question platform according to some examples of the present disclosure.

FIG. 3 shows one example of fulfilling the contract 2045 performed by a question platform according to some examples of the present disclosure. In some examples, the question portal may implement one or more quality control measures to assess the validity of the answers to the survey. For example, the publisher portal may optionally include one or more proof questions at operation 3025 that are designed to indicate whether the entity is a real person that is paying attention and responding seriously. For example, the question may be a factual question, such as a question with an obvious answer (e.g., "Water is which color?") which a majority of entities would reasonably be expected to know (e.g., a question that a predetermined number of entities have successfully answered in previous surveys). In other examples, the proof question may be a question about the entity determined from the entity profile (e.g., "Your first name is Brad T/F?"). In the latter examples, the proof questions may also confirm information in the entity profile. In some examples, the question portal may also include proof questions that attempt to verify demographic information. For example, if the question portal was somewhat confident that the entity matches a demographic criteria, the survey may be assigned to the entity even though the question portal is not 100% sure. At operation 3030 the questions (optionally with the test and/or proof questions) are sent to the publisher for presentation to the entity.

At operation 3035, the answers are received. At operation 3040 the answers may be validated. For example by comparing the answers to the proof or proof questions to the actual answers. If the answers are correct (or if enough answers are correct), the answers may be validated and control proceeds to operation 3045. If the answers are not correct (or if enough answers are incorrect), the question platform may notify the publisher at operation 3055 and select another entity 3060 to fulfill the contract. In some examples, to prevent publishers from attempting to utilize "bots" to fulfill surveys, the system may penalize the publisher if an entity's answers cannot be validated. In some examples, every time a publisher submits survey answers that fail validation the publisher may be penalized. In other example, the publisher may be penalized once a threshold level of validation failures has been crossed. The question platform may utilize different forms of "bot control" to prevent the use of bots from fulfilling surveys. Algorithms and bot controls may be utilized to monitor quality and validate the fulfilled surveys. In an embodiment, the question platform may utilize one or more anti-bot tools or applications available from a third party.

If the validation is successful, at operation 3045, the results of the survey are sent back to the survey creator and at operation 3050 payment is disbursed to the publisher (e.g., in the form of a payment token, a credit, a balance increase of an account stored in a database of the question platform, and the like). The payment disbursement of operation 3050 may or may not happen immediately following the sending the results of the survey to the creator at operation 3045, but the survey creator may be prompted to submit payment following operation 3045.

While FIGS. 2-3 showed a particular implementation, one of ordinary skill in the art with the benefit of Applicant's disclosure will appreciate that other ways of matching entities with surveys are possible and other ways of fulfilling the contract. For example, rather than iterating through each entity, the question platform may iterate through each survey, matching entities to a particular survey. In other examples, rather than individually applying the price matching at operation 2035 to each entity, the set of entities and the set of matching surveys may be determined and the assignment of an entity to a particular survey may be done as a group. In these examples, additional profit may be made for the question platform as the system may determine an assignment of entities to surveys that maximizes a total spread, rather than maximizing each spread on an entity-by-entity basis.

Figure 4:
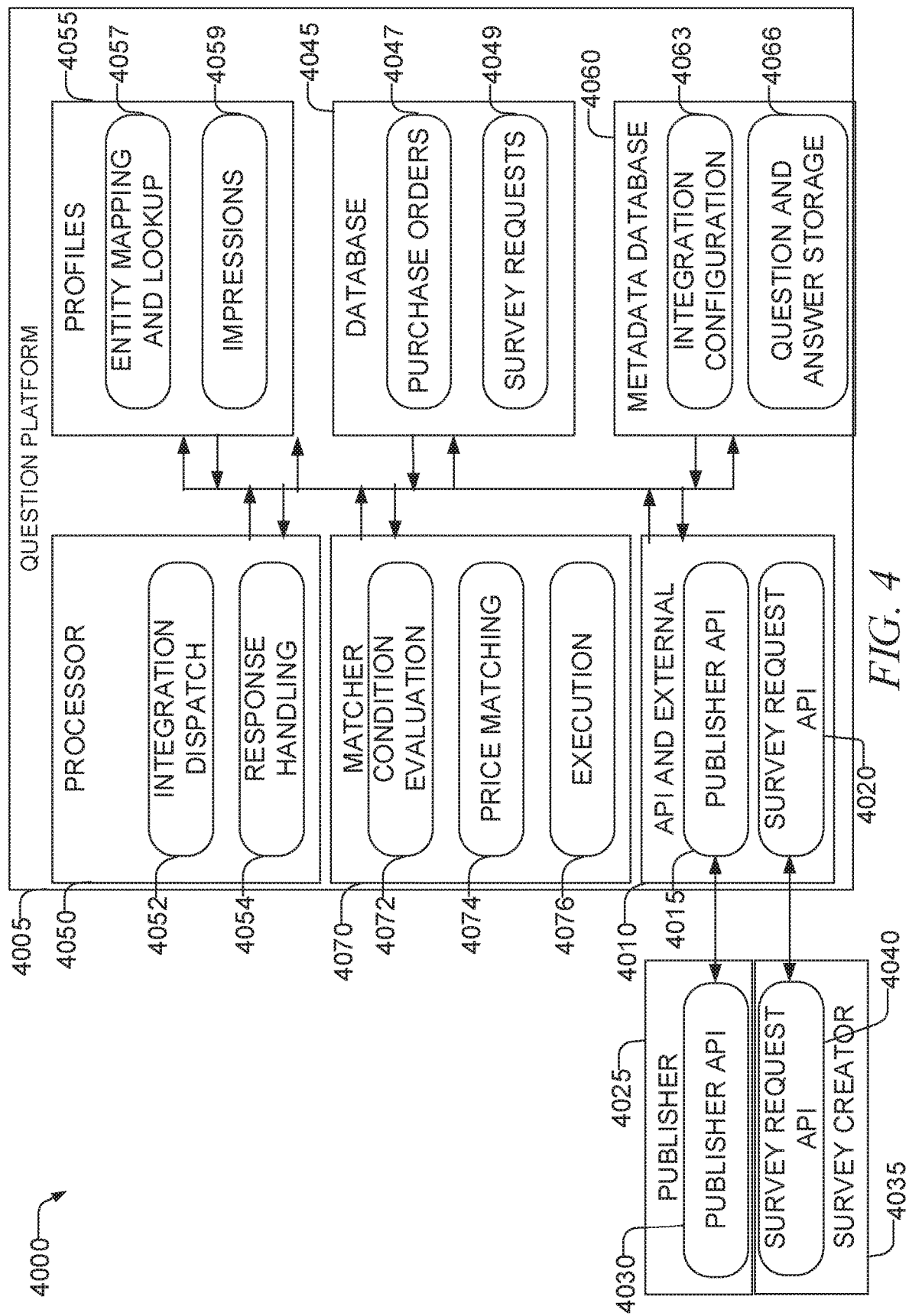
FIG. 4 shows a logical diagram of a question platform, a publisher portal, and a survey creator portal according to some examples of the present disclosure.

FIG. 4 shows a logical diagram 4000 of a question platform 4005 (which may be an embodiment of question platform 1060), a publisher portal 4025, and a survey creator portal 4035 according to some examples of the present disclosure. Publisher portal 4025 may be an embodiment of a publisher portal 1030. Likewise survey creator portal 4035 may be an example of a survey creator portal 1080. API and external component 4010 may include a publisher API 4015 which provides programmatic access to a publisher portal 4025. Publisher portal 4025 may execute a client side publisher API component 4030. Client side publisher API component 4030 and publisher API component 4015 communicate using the publisher API. API and external component 4010 may also execute a survey request API 4020 which may provide programmatic access to a survey creator portal 4035 executing a client side survey request API component 4040. Client side survey request API component 4040 and survey request API component 4020 communicate using the survey request API. API and external component 4010 may receive entity availability notifications and surveys and store them in a database, such as database 4045. Database 4045 may store both entity availability notifications 4047 and survey requests 4049. Publisher API 4015 may also create and store entity profiles upon receiving an entity availability notification.

Processor component 4050 may process entities prior to matching by determining information about the entities. For example, processor component 4050 may determine demographic information and content criteria for a particular entity. In some examples, processing component matches available entities (from entity availability notifications) with profile information stored in profiles component 4055. For example, the integration dispatch component 4052 may query the entity mapping and lookup component 4057 of profiles component 4055 to determine if there is a profile match and to determine which demographic and other entity information is available in the profile. Other demographic information that is needed for particular surveys may be determined by calling the metadata database 4060. Integration configuration component 4063 of metadata database 4060 may map between demographic and other information and information sources. For example, the response handling component 4054 may then fetch additional data about the entity from these sources. Examples include tagging or tracking components (not shown for clarity) that may track users via cookies or other web tracking technologies or may include external sources (e.g., from public sources, such as a social networking service, an internet search engine, public records, or the like). Response handling component 4054 may handle responses from various components to requests for entity information by assembling the returned data, and/or by consulting additional data sources as provided by the metadata database 4060.

Matcher component 4070 may have a condition evaluation component 4072 which evaluates the demographics of each entity against the stated demographics of a particular survey and builds lists of entities that are qualified to take a particular survey (or vice versa). Next (or in some examples, at the same time) the condition evaluation component 4072 may remove entities that are restricted from consideration due to content restrictions. Price matching component 4074 then matches the remaining entities to surveys based upon a price matching—e.g., by utilizing a price model. Price matching component 4074 also is responsible for building and maintaining the price matching model. The price matching model may be a series of one or more price matching rules. For example, the model may select the lowest spread (e.g., a customer centric model), the highest spread (e.g., to maximize profit if the question platform profits on the spread), or some other model. Execution component 4076 may then create contracts between the publishers and the survey creators. Execution component 4076 may also direct the API and external component 4010 to send the questions to the entity through the publisher (e.g., publisher portal 4025). In addition, execution component may insert test and/or proof questions that are stored in question and answer storage 4066 of metadata database 4060. Execution component 4076 may then handle the answers as they are received, verify the answers, and cause the survey request API 4020 to provide the answers to the survey creator (e.g., survey creator portal 4035). In addition the execution component may process payments from the survey creator to the publisher. Furthermore, execution component 4076 may store the questions and answers in the question and answer storage 4066.

In some examples, upon receipt of a survey request, the API and external component 4010 may consult the metadata database 4060 and the question and answer storage 4066 to determine if the questions in the survey are the same or similar to previously answered questions. In some examples, the previously answered questions may then be provided to the survey creator. In some examples, the answers are categorized by demographic information (or a link to the entity profile) of the entity that answered them so as to ensure that the answers reflect the requisite demographics. In some examples, answers that are too old are not provided and may be expunged from the question and answer storage 4066 (or moved to long term storage).

Similar questions may be determined through one or more machine learning algorithms utilizing natural language processing may determine a similarity of questions. In some examples, the answers are provided with the similar questions and the survey creator can utilize the pre-stored answers, or request new entities answer their specific questions.

Impressions component 4059 may determine which advertisements a particular entity has viewed and report this to the response handling component 4054 of processor component 4050. For example, using cookies, image tracking beacons, and the like. This information may be utilized by a survey creator who may specify demographic criteria that an entity has viewed a particular advertisement as a criteria for taking a particular survey.

Figure 5:
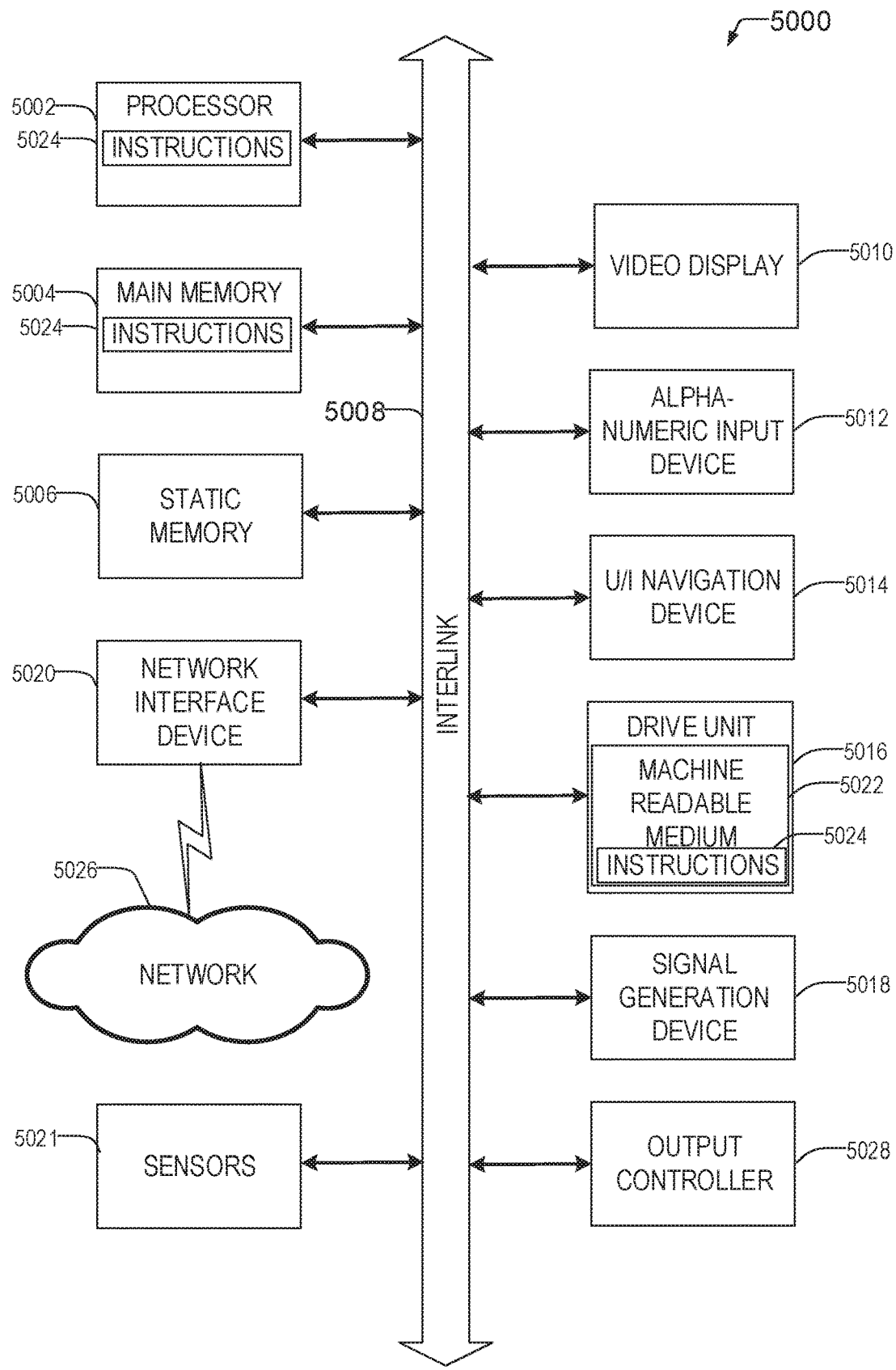
FIG. 5 is a block diagram illustrating an example of a machine which may be configured to perform or implement one or more embodiments disclosed herein according to some examples of the present disclosure.

FIG. 5 illustrates a block diagram of an example machine 5000 upon which any one or more of the techniques (e.g., methodologies) discussed herein may perform. In alternative embodiments, the machine 5000 may operate as a standalone device or may be connected (e.g., networked) to other machines. In a networked deployment, the machine 5000 may operate in the capacity of a server machine, a client machine, or both in server-client network environments. In an example, the machine 5000 may act as a peer machine in peer-to-peer (P2P) (or other distributed) network environment. The machine 5000 may be a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, the machine 5000 may implement one or more portions of the question platform 1060, 4005, end user computing devices 1010, portals 1030, portals 1080, portals 4025, and 4035, and other databases (e.g., such as database 1065). Machine 5000 may perform the methods of FIGS. 2 and 3. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 5000 may include a hardware processor 5002 (e.g., a central processing unit (CPU), a graphics processing unit (GPU), a hardware processor core, or any combination thereof), a main memory 5004 and a static memory 5006, some or all of which may communicate with each other via an interlink (e.g., bus) 5008. The machine 5000 may further include a display unit 5010, an alphanumeric input device 5012 (e.g., a keyboard), and a user interface (UI) navigation device 5014 (e.g., a mouse). In an example, the display unit 5010, input device

5012 and UI navigation device 5014 may be a touch screen display. The machine 5000 may additionally include a storage device (e.g., drive unit) 5016, a signal generation device 5018 (e.g., a speaker), a network interface device 5020, and one or more sensors 5021, such as a global positioning system (GPS) sensor, compass, accelerometer, or other sensor. The machine 5000 may include an output controller 5028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" may include any medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 5024 may further be transmitted or received over a communications network 5026 using a transmission medium via the network interface device 5020. The Machine 5000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5020 may include one or more physical jacks (e.g., Ethernet, coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. In some examples, the network interface device 5020 may wirelessly communicate using Multiple User MIMO techniques.

VARIOUS EXAMPLES

Example 1 is a method of providing an electronic survey marketplace comprising: using a network-accessible computing device: receiving an entity availability notification from a publisher having a publisher portal using an Application Programming Interface (API), the entity availability notification comprising a description of an entity that is willing to participate in an electronic survey and an ask price; determining an entity profile for the entity using at least part of the description of the entity, the entity profile comprise at least one demographic item of information describing the entity; determining a first set of one or more surveys submitted by one or more survey creator portals through a second API that have demographic criteria that match the at least one demographic item of information; determining a particular survey from the first set of one or more surveys using a pricing model, the pricing model utilizing the particular survey's bid price and the ask price for the entity; creating a digital contract between a survey creator of the particular survey and the publisher; sending survey questions corresponding to the particular survey to the entity through the publisher portal using the API; receiving answers to the survey questions; determining the answers are valid; and responsive to determining that the answers are valid, sending the answers over the second API to the survey creator and processing a funds transfer from the survey creator to the publisher.

In Example 2, the subject matter of Example 1 includes, wherein the description of the entity comprises a device identification of a computing device of the entity, and wherein determining the entity profile comprises retrieving the entity profile from storage using the device identification.

In Example 3, the subject matter of Examples 1-2 includes, wherein the description of the entity comprises a name of the entity, and wherein determining the entity profile comprises retrieving the entity profile from storage using the name.

In Example 4, the subject matter of Examples 1-3 includes, wherein the description of the entity comprises a text field, and wherein determining the entity profile comprises utilizing a fuzzy string matching algorithm that outputs a confidence score that is within a predetermined range.

In Example 5, the subject matter of Examples 1-4 includes, wherein sending survey questions corresponding to the particular survey to the entity comprises inserting proof questions and wherein determining the answers are valid comprises determining that the proof questions were answered correctly.

In Example 6, the subject matter of Examples 1-5 includes, wherein determining the particular survey using the pricing model includes utilizing a highest spread between the particular survey's bid price and the ask price and further comprising maximizing the highest spread for a plurality of entities and a plurality of surveys.

In Example 7, the subject matter of Examples 1-6 includes, wherein the description of the entity comprises information identifying a tracking cookie.

In Example 8, the subject matter of Examples 1-7 includes, wherein the method further comprises storing the answers to the survey questions in a database.

In Example 9, the subject matter of Example 8 includes, wherein determining the answers are valid comprises: comparing the answers to a set of answers stored in the database.

Example 10 is a system of providing an electronic survey marketplace comprising: a network-accessible computing device including a processor and memory: receive an entity availability notification from a publisher having a publisher portal using an Application Programming Interface (API), the entity availability notification comprising a description of an entity that is willing to participate in an electronic survey and an ask price; determine an entity profile for the entity using at least part of the description of the entity, the entity profile comprise at least one demographic item of information describing the entity; determine a first set of one or more surveys submitted by one or more survey creator portals through a second API that have demographic criteria that match the at least one demographic item of information; determine a particular survey from the first set of one or more surveys using a pricing model, the pricing model utilizing the particular survey's bid price and the ask price for the entity; create a digital contract between a survey creator of the particular survey and the publisher; send survey questions corresponding to the particular survey to the entity through the publisher portal using the API; receive answers to the survey questions; determine the answers are valid; and responsive to determining that the answers are valid, send the answers over the second API to the survey creator and processing a funds transfer from the survey creator to the publisher.

In Example 11, the subject matter of Example 10 includes, wherein the description of the entity comprises a device identification of a computing device of the entity, and wherein to determine the entity profile, the network-accessible computing device is to retrieve the entity profile from storage using the device identification.

In Example 12, the subject matter of Examples 10-11 includes, wherein the description of the entity comprises a name of the entity, and wherein to determine the entity profile, the network-accessible computing device is to retrieve the entity profile from storage using the name.

In Example 13, the subject matter of Examples 10-12 includes, wherein the description of the entity comprises a text field, and wherein to determine the entity profile, the network-accessible computing device is to utilize a fuzzy string matching algorithm that outputs a confidence score that is within a predetermined range.

In Example 14, the subject matter of Examples 10-13 includes, wherein to send survey questions corresponding to the particular survey to the entity the network-accessible computing device is to insert proof questions and wherein to determine the answers are valid the network-accessible computing device is to determine that the proof questions were answered correctly.

In Example 15, the subject matter of Examples 10-14 includes, wherein to determine the particular survey using the pricing model the network-accessible computing device is to utilize a highest spread between the particular survey's bid price and the ask price and wherein the network-accessible computing device is to maximize the highest spread for a plurality of entities and a plurality of surveys.

In Example 16, the subject matter of Examples 10-15 includes, wherein the description of the entity comprises information identifying a tracking cookie.

In Example 17, the subject matter of Examples 10-16 includes, wherein the network-accessible computing device is to send the answers to the survey questions to a database to store.

In Example 18, the subject matter of Example 17 includes, wherein to determine the answers are valid, the network-accessible computing device is to compare the answers to a set of answers stored in the database.

Example 19 is a non-transitory machine readable medium including a processor and memory storing instructions for providing an electronic survey marketplace, which when executed by the processor cause the processor to: receive an entity availability notification from a publisher having a publisher portal using an Application Programming Interface (API), the entity availability notification comprising a description of an entity that is willing to participate in an electronic survey and an ask price; determine an entity profile for the entity using at least part of the description of the entity, the entity profile comprise at least one demographic item of information describing the entity; determine a first set of one or more surveys submitted by one or more survey creator portals through a second API that have demographic criteria that match the at least one demographic item of information; determine a particular survey from the first set of one or more surveys using a pricing model, the pricing model utilizing the particular survey's bid price and the ask price for the entity; create a digital contract between a survey creator of the particular survey and the publisher; send survey questions corresponding to the particular survey to the entity through the publisher portal using the API; receive answers to the survey questions; determine the answers are valid; and responsive to determining that the answers are valid, send the answers over the second API to the survey creator and processing a funds transfer from the survey creator to the publisher.

In Example 20, the subject matter of Example 19 includes, wherein the description of the entity comprises a device identification of a computing device of the entity, and wherein to determine the entity profile, the processor is to retrieve the entity profile from storage using the device identification.

In Example 21, the subject matter of Examples 19-20 includes, wherein the description of the entity comprises a name of the entity, and wherein to determine the entity profile, the processor is to retrieve the entity profile from storage using the name.

In Example 22, the subject matter of Examples 19-21 includes, wherein the description of the entity comprises a text field, and wherein to determine the entity profile, the processor is to utilize a fuzzy string matching algorithm that outputs a confidence score that is within a predetermined range.

In Example 23, the subject matter of Examples 19-22 includes, wherein to send survey questions corresponding to the particular survey to the entity the processor is to insert proof questions and wherein to determine the answers are valid the processor is to determine that the proof questions were answered correctly.

In Example 24, the subject matter of Examples 19-23 includes, wherein to determine the particular survey using the pricing model the processor is to utilize a highest spread between the particular survey's bid price and the ask price and wherein the processor is to maximize the highest spread for a plurality of entities and a plurality of surveys.

In Example 25, the subject matter of Examples 19-24 includes, wherein the description of the entity comprises information identifying a tracking cookie.

In Example 26, the subject matter of Examples 19-25 includes, wherein the processor is to send the answers to the survey questions to a database to store.

In Example 27, the subject matter of Example 26 includes, wherein to determine the answers are valid, the processor is to compare the answers to a set of answers stored in the database.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

What is claimed is:

1. A method of providing an electronic survey marketplace, using a network-accessible computing device, comprising:
   receiving an entity availability notification from a publisher having a publisher portal using an Application Programming Interface (API), the entity availability notification comprising a description of an entity that is willing to participate in an electronic survey and an ask price, wherein the description of the entity comprises a text field and wherein the ask price is determined by the publisher and wherein the publisher is external to the electronic survey marketplace;
   determining an entity profile, from a stored set of entity profiles, the entity profile comprising at least one demographic item of information describing the entity, wherein determining the entity profile comprises:
      generating a confidence score for each entity profile in the stored set of entity profiles using a fuzzy string matching algorithm with the text field and a field for each respective entity profile;
      selecting the entity profile based on the respective confidence score exceeding a predetermined threshold;
   determining a first set of surveys submitted by one or more survey creator portals through a second API that have demographic criteria that match the at least one demographic item of information;
   determining a particular survey from the first set of surveys using a pricing model, the pricing model utilizing the particular survey's bid price and the ask price for the entity;
   creating a digital contract between a survey creator of the particular survey and the publisher for the completion of the particular survey by the entity;
   sending survey questions corresponding to the particular survey to the entity through the publisher portal using the API;
   receiving answers to the survey questions;
   determining the answers are valid; and
   responsive to determining that the answers are valid, sending the answers over the second API to the survey creator and processing a funds transfer from the survey creator to the publisher.

2. The method of claim 1, wherein the description of the entity comprises a device identification of a computing device of the entity, and wherein determining the entity profile further comprises identifying the entity profile from stored set of entity profiles using the device identification.

3. The method of claim 1, wherein the description of the entity comprises a name of the entity, and wherein determining the entity profile further comprises identifying the entity profile from stored set of entity profiles using the name.

4. The method of claim 1, wherein sending survey questions corresponding to the particular survey to the entity comprises inserting proof questions and wherein determining the answers are valid comprises determining that the proof questions were answered correctly.

5. The method of claim 1, wherein determining the particular survey using the pricing model includes utilizing a highest spread between the particular survey's bid price and the ask price and further comprising maximizing the highest spread for a plurality of entities and a plurality of surveys.

6. The method of claim 1, wherein the description of the entity comprises information identifying a tracking cookie.

7. A system for providing an electronic survey marketplace comprising:
   a network-accessible computing device, including a processor and memory, is to:
      receive an entity availability notification from a publisher having a publisher portal using an Application Programming Interface (API), the entity availability notification comprising a description of an entity that is willing to participate in an electronic survey and an ask price, wherein the description of the entity comprises a text field and wherein the ask price is determined by the publisher and wherein the publisher is external to the electronic survey marketplace;
      determine an entity profile, from a stored set of entity profiles, the entity profile comprising at least one demographic item of information describing the entity, wherein determining the entity profile, the network-accessible computing device is to:
         generate a confidence score for each entity profile in the stored set of entity profiles using a fuzzy string matching algorithm with the text field and a field for each respective entity profile;
         select the entity profile based on the respective confidence score exceeding a predetermined threshold;
      determine a first set of surveys submitted by one or more survey creator portals through a second API that have demographic criteria that match the at least one demographic item of information;
      determine a particular survey from the first set of surveys using a pricing model, the pricing model utilizing the particular survey's bid price and the ask price for the entity;
      create a digital contract between a survey creator of the particular survey and the publisher for the completion of the particular survey by the entity;
      send survey questions corresponding to the particular survey to the entity through the publisher portal using the API;
      receive answers to the survey questions;
      determine the answers are valid; and
      responsive to determining that the answers are valid, send the answers over the second API to the survey creator and processing a funds transfer from the survey creator to the publisher.

8. The system of claim 7, wherein the description of the entity comprises a device identification of a computing device of the entity, and wherein to determine the entity profile, the network-accessible computing device is further to retrieve the entity profile from stored set of entity profiles using the device identification.

9. The system of claim 7, wherein the description of the entity comprises a name of the entity, and wherein to determine the entity profile, the network-accessible computing device is further to retrieve the entity profile from stored set of entity profiles using the name.

10. The system of claim 7, wherein to send survey questions corresponding to the particular survey to the entity the network-accessible computing device is to insert proof questions and wherein to determine the answers are valid the network-accessible computing device is to determine that the proof questions were answered correctly.

11. The system of claim 7, wherein to determine the particular survey using the pricing model the network-accessible computing device is to utilize a highest spread between the particular survey's bid price and the ask price and wherein the network-accessible computing device is to maximize the highest spread for a plurality of entities and a plurality of surveys.

12. The system of claim 7, wherein the description of the entity comprises information identifying a tracking cookie.

13. A non-transitory machine readable medium including instructions for providing an electronic survey marketplace, which when executed by a processor cause the processor to:
receive an entity availability notification from a publisher having a publisher portal using an Application Programming Interface (API), the entity availability notification comprising a description of an entity that is willing to participate in an electronic survey and an ask price, wherein the description of the entity comprises a text field and wherein the ask price is determined by the publisher and wherein the publisher is external to the electronic survey marketplace;
determine an entity profile, from a stored set of entity profiles, the entity profile comprising at least one demographic item of information describing the entity, wherein determining the entity the processor is to:
generate a confidence score for each entity profile in the stored set of entity profiles using a fuzzy string matching algorithm with the text field and a field for each respective entity profile;
select the entity profile based on the respective confidence score exceeding a predetermined threshold;
determine a first set of one or more surveys submitted by one or more survey creator portals through a second API that have demographic criteria that match the at least one demographic item of information;
determine a particular survey from the first set of one or more surveys using a pricing model, the pricing model utilizing the particular survey's bid price and the ask price for the entity;
create a digital contract between a survey creator of the particular survey and the publisher for the completion of the particular survey by the entity;
send survey questions corresponding to the particular survey to the entity through the publisher portal using the API;
receive answers to the survey questions;
determine the answers are valid; and
responsive to determining that the answers are valid, send the answers over the second API to the survey creator and processing a funds transfer from the survey creator to the publisher.

14. The machine readable medium of claim 13, wherein the description of the entity comprises a device identification of a computing device of the entity, and wherein to determine the entity profile, the processor is further to retrieve the entity profile from stored set of entity profiles using the device identification.

15. The machine readable medium of claim 13, wherein the description of the entity comprises a name of the entity, and wherein to determine the entity profile, the processor is further to retrieve the entity profile from stored set of entity profiles using the name.

16. The machine readable medium of claim 13, wherein to send survey questions corresponding to the particular survey to the entity the processor is to insert proof questions and wherein to determine the answers are valid the processor is to determine that the proof questions were answered correctly.

17. The machine readable medium of claim 13, wherein to determine the particular survey using the pricing model the processor is to utilize a highest spread between the particular survey's bid price and the ask price and wherein the processor is to maximize the highest spread for a plurality of entities and a plurality of surveys.

* * * * *